United States Patent [19]

Tullos et al.

[11] 3,774,452

[45] Nov. 27, 1973

[54] HELICAL COIL BOURDON TUBE SUPPORT ASSEMBLY

[76] Inventors: Aubrey R. Tullos, 1510 Haywood St.; Ray Dewitt, c/o Meter Service & Supply Co., P.O. Box 2373, both of Odessa, Tex. 79760

[22] Filed: Nov. 22, 1971

[21] Appl. No.: 200,744

[52] U.S. Cl. .................................. 73/418, 73/368.6
[51] Int. Cl. ........................... G01l 7/04, G01k 5/36
[58] Field of Search .................. 73/420, 411 R, 418, 73/368.6; 308/DIG. 7, DIG. 8

[56] References Cited
UNITED STATES PATENTS

| | | | |
|---|---|---|---|
| 3,301,062 | 1/1967 | Reesby et al. | 73/418 |
| 1,195,334 | 8/1916 | Bristol | 73/411 |
| 1,902,931 | 3/1933 | Zubaty | 73/418 |
| 2,541,790 | 2/1951 | Sugden et al. | 308/DIG. 8 |
| 1,663,313 | 3/1928 | Motherwell | 73/411 |
| 2,943,489 | 7/1960 | Haigler | 73/418 |
| 1,038,526 | 9/1912 | Bristol | 73/411 |
| 3,067,616 | 12/1962 | Silver | 73/418 X |

FOREIGN PATENTS OR APPLICATIONS

| | | | |
|---|---|---|---|
| 873,525 | 7/1961 | Great Britain | 308/DIG. 7 |

*Primary Examiner*—Richard C. Queisser
*Assistant Examiner*—Daniel M. Yasich
*Attorney*—William A. Strauch et al.

[57] ABSTRACT

An improved Bourdon tube and support assembly including a rigid base plate with the pressure inlet end of a helical coil Bourdon tube mounted on the base plate. A readout arm or measuring pointer is secured to the closed, reading output end of the Bourdon tube, a guide post is mounted on the base plate coincident with the axis of the helical coil Bourdon tube and a low friction coefficient bearing assembly interconnects the spindle and a readout arm drive post. The support assembly has structural and functional characteristics which eliminate spiralling (weaving undulations) of the helical coil when the Bourdon tube is subjected to expansion. Minimal thrust characteristics are incorporated in the bearing assembly, thereby minimizing friction and in turn reducing hysteresis of the entire assembly to a minimum factor for a substantially errorless readout. In a primary embodiment, the bearing assembly is purely a radial bearing; in a secondary embodiment, the bearing may be a conical bearing assembly.

14 Claims, 9 Drawing Figures

INVENTORS
AUBREY R. TULLOS
RAY DeWITT

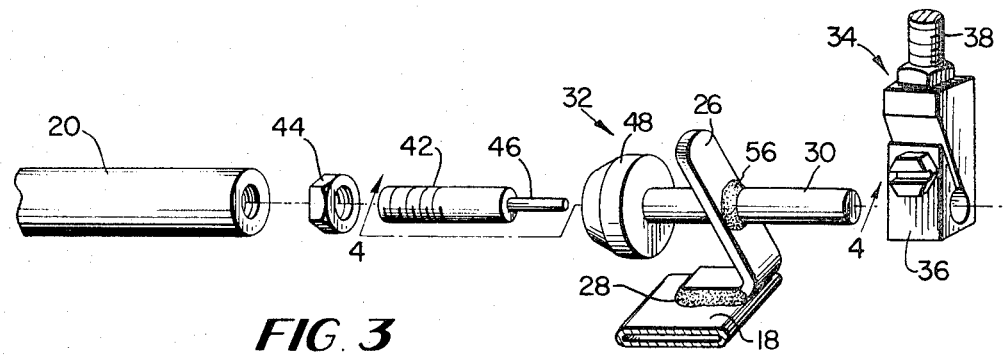
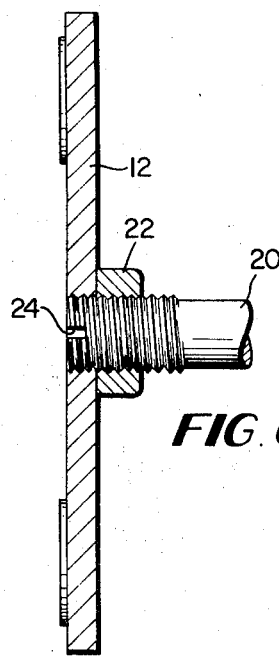
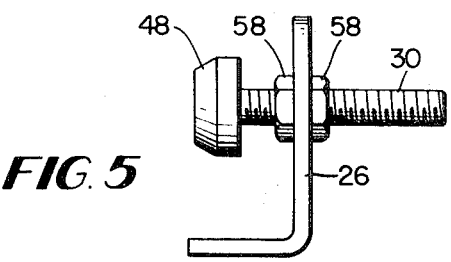
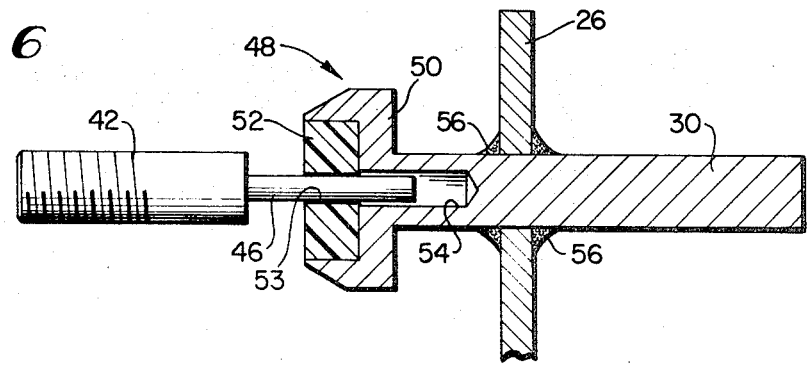
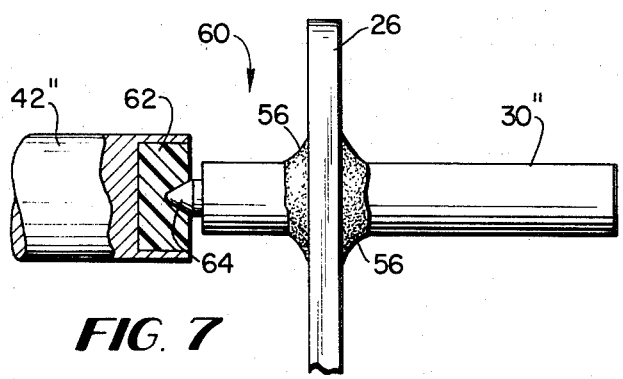

INVENTORS
AUBREY R. TULLOS
RAY DE WITT

HELICAL COIL BOURDON TUBE SUPPORT ASSEMBLY

BACKGROUND OF THE INVENTION

The invention relates to gauges of the recording or non-recording type for measuring pressures, temperatures or rates of flow where a helical coil Bourdon tube is employed for sensing changes in pressure, temperature or rate of flow and to transfer the sensed condition to mechanical movement of a pointer arm or recording device as a result of coiling or uncoiling in response to the sensed condition. The present invention pertains to such a helical coil Bourdon tube assembly having unique support structure which so controls movement of the tube as to minimize readout error.

For many years, Bourdon tubes of the helical coil form have been used in some installations as the primary condition sensing element in pressure, temperature and rate of flow meters. One reason why the helical Bourdon tube or spring is a highly desirable unit is because of its inherent simple structure and relatively easy calibration. Nevertheless, its susceptibility to readout and hysteresis error is well-known and there have been previous efforts to improve the structure in an attempt to reduce readout error to a minimal or negligible factor. Such errors have been due to radial, axial, bending, torsional and other stresses characteristic of the helical Bourdon tube as it coils and uncoils in response to pressure or temperature changes received therewithin.

In a primitive state of development, the helical coil Bourdon tube was mounted with its pressure or temperature inlet end fixed to a rigid base and a readout arm or pointer attached to the output, or free, closed end of the helix constituting the Bourdon tube. The pointer or readout arm would sweep over a dial or recording chart in response to coiling and/or uncoiling of the tube. Unfortunately, such a Bourdon tube free end would spiral outwardly, wobble somewhat, and move axially thereby considerably distorting the accuracy of the desired readout.

Another stage of previously known development in supports for helical coil Bourdon tubes was to mount a rigid post at the outside of the coil with an arm extending from the post to a position over the axis of the coil. A mounting bar was extended from the output end of the Bourdon tube to the axis and a pointer or readout arm mount was placed between the post arm and mounting bar. Thus, the effects of spiral motion of the Bourdon tube were substantially negated, but a fitting had to be provided between the rotating arm mount and the fixed post arm, and that induced friction and hysteresis errors into the readout; thus new errors replaced the prior undesirable spiral movement error.

A logical subsequent step was to mount a rigid center guide post, concentrically within the rotating arm mount, extending from the post arm to the base of the support assembly. Again, the effects of spiral movement of the helical coil were negated but the amount of friction still present between the guide post and the rotating readout arm mount imparted undesirable hysteresis into the reading desired. Necessary axial movement of the readout arm mount during coiling or uncoiling movement of the helical coil induced additional friction lag, an operative aspect which is relatively unsatisfactory.

A considerable number of variations on the center guide post arrangement of helical coil supports produced a variety of acceptable devices, but ones in which readout error remained 5 to 6 percent, to either side of the true value. In one case, the guide post rather than being made stationary was replaced by a rotary post, i.e., one which was journalled for rotation in the post arm and the base, and to which the readout arm or pointer was directly attached. Such a structure is shown in U.S. Pat. No. 1,188,615 issued to Bristol et al.; Bristol U.S. Pat. No. 1,195,334; Middleton et al. U.S. Pat. No. 1,906,705; Reynolds et al. U.S. Pat. No. 1,970,819; Beecher U.S. Pat. No. 2,088,569; Young U.S. Pat. No. 2,209,910; and Lindsay U.S. Pat. No. 3,375,719. An attempt to minimize errors caused by friction in relatively movable parts is disclosed in Kamenstine U.S. Pat. No. 1,837,222 wherein jewel bearings 16a, 26a are provided at each end of the readout arm rotating mounting post.

It was then thought that the number of parts and the effects of friction inducing readout error could be reduced by eliminating the outer support post which had an arm extending over the output end of the helical coil and replacing the center guide post with a fixed post extending upwardly from the base with a readout arm post (attached to the output end of the helical coil) journalled coaxially to the fixed guide post. This is shown in Huston U.S. Pat. No. 3,277,722, FIG. 2. Alternatively, the guide post could extend coaxially along the full length or height of the helical coil Bourdon tube, with a readout arm or pointer mounting bracket from the outer end of the coil journalled to the fixed guide post. This is disclosed in Bristol U.S. Pat. No. 1,045,770; Harrison U.S. Pat. No. 1,982,300, and Haigler U.S. Pat. No. 2,943,489.

Still, readout errors on the order of 5 to 6 percent were present in such devices. The present invention reduces the readout error while still retaining the desirable elimination of spiral and wobble movement of the output end of the helical coil Bourdon tube. The invention accomplishes the desired results with structure providing a bearing surface, which is substantially radial, between relatively moving parts, the bearing surfaces being so arranged that thrust friction is substantially negated. As a result, readout errors have been reduced from the usual range of 5 to 6 percent down to about 1 percent or less.

SUMMARY OF THE INVENTION

It is a principal object of this invention to provide a novel helical coil Bourdon tube support structure for a pressure gauge, flowmeter, or similar type apparatus wherein readout error due to structural imperfections inherent in the components of the support are reduced to acceptable, negligible percentages.

It is another object of the invention to provide a novel helical coil Bourdon tube support as hereinbefore described wherein friction between relatively moving parts imparting readout error is reduced to a negligible factor by the provision of a bearing having substantially radial characteristics only.

Yet another object of the invention is to provide a novel helical coil Bourdon tube support with a radial bearing surface between relatively moving parts wherein one of the surfaces is formed from a synthetic material which is effectively self lubricated.

A further object of the invention is to provide a helical coil Bourdon tube support with bearing surfaces between relatively moving parts, the mounts for the bearing surfaces being adjustable along the axis of the helical coil to properly position and calibrate the Bourdon tube.

Further novel features and other objects of this invention will become apparent from the following detailed description, discussion and the appended claims taken in conjunction with the accompanying drawings.

BRIEF DESCRIPTION OF DRAWINGS

Preferred structural embodiments of this invention are disclosed in the accompanying drawings in which:

FIG. 3 is an exploded view of the bearing assembly and mounts therefor;

FIG. 4 is a sectional view taken along lines 4—4 of FIG. 3, and drawn to an enlarged scale;

FIG. 5 is a side elevation of an embodiment of the invention showing an alternative, adjustable mount for one of the bearing members;

FIG. 6 is a sectional view taken along lines 6—6 of FIG. 2, and drawn to an enlarged scale;

FIG. 7 is a sectional view of an alternative embodiment of the bearing surfaces illustrated in FIGS. 1–6, and drawn to an enlarged scale.

DESCRIPTION OF THE PREFERRED EMBODIMENTS

Figure 1:
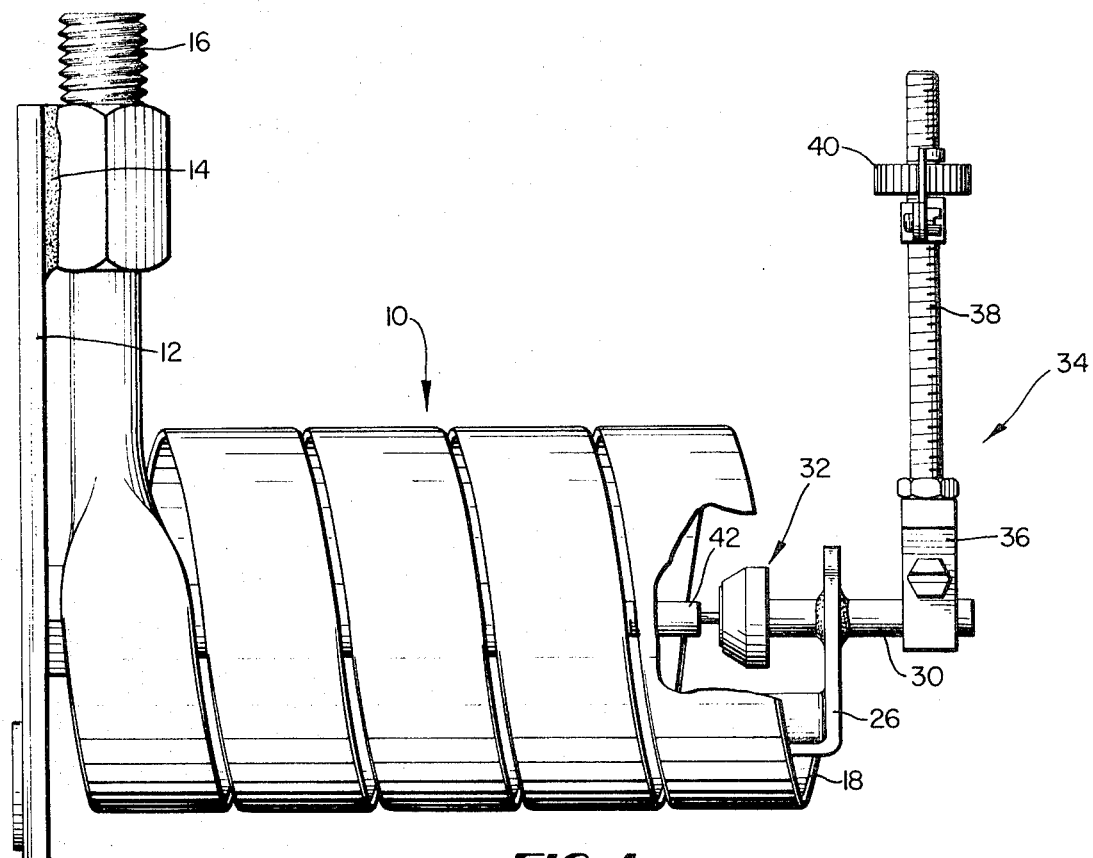
FIG. 1 is an elevational view of the invention partially broken away to show interior detail.

The invention comprises a support structure for a helical coil Bourdon tube 10 which is useful in such apparatus as flowmeters, pressure meters and other pressure or temperature sensitive indicating or recording instruments, all as hereinbefore discussed. Bourdon tube 10 is firmly mounted on a base 12 by means such as silver solder 14 or the equivalent, and includes, at its input terminal end, a pressure fitting 16 which receives a line from the fluid source (not shown) to be measured by the Bourdon tube. In a preferred embodiment, Bourdon tube 10 is flattened into a ribbon-like appearance as illustrated in order to reduce axial movement of the outer, readout end 18 as the helical coil turns in response to internal pressure, thereby minimizing readout error. Tube 10 is wound as a helix and usually comprises up to a half a dozen turns or convolutions to amplify movement of the tube in response to internal temperature or pressure variations.

It is important in such Bourdon tube gauges not only to minimize axial movement of output end 18 but also to eliminate any spiralling or radial movement thereof, with respect to the long axis of the helix formed by Bourdon tube 10. A guide post 20 is mounted coincident with the axis of tube 10 and, in a preferred embodiment, is threaded to base 12 enabling axial adjustment therein, the post being fixed in adjusted position by a locknut 22 (FIG. 6). The base plate end of guide post 20 may be slotted at 24 to receive a screwdriver or similar tool (not shown) for turning the post to its proper adjusted position. Bourdon tube readout end 18 carries a mounting bar 26, silver soldered or otherwise suitably affixed thereto at 28. The mounting bar 26 has a readout arm or pointer drive post 30 projecting therethrough and coaxially aligned with guide post 20. Guide post 20 and drive post 30 are interconnected by a novel bearing assembly 32 having primarily radial characteristics, several embodiments of which will be described in detail hereinbelow. A pointer or recorder pen support assembly 34 is secured to the outer free end of drive post 30. Details of construction of support 34 are not crucial to the invention. However, in the form shown, assembly 34 is connected to post 30 by spring metal bolt base 36 having a threaded rod 38 extended therefrom with an adjustable mount 40 thereon for the pen or pointer (not shown).

Figure 2:
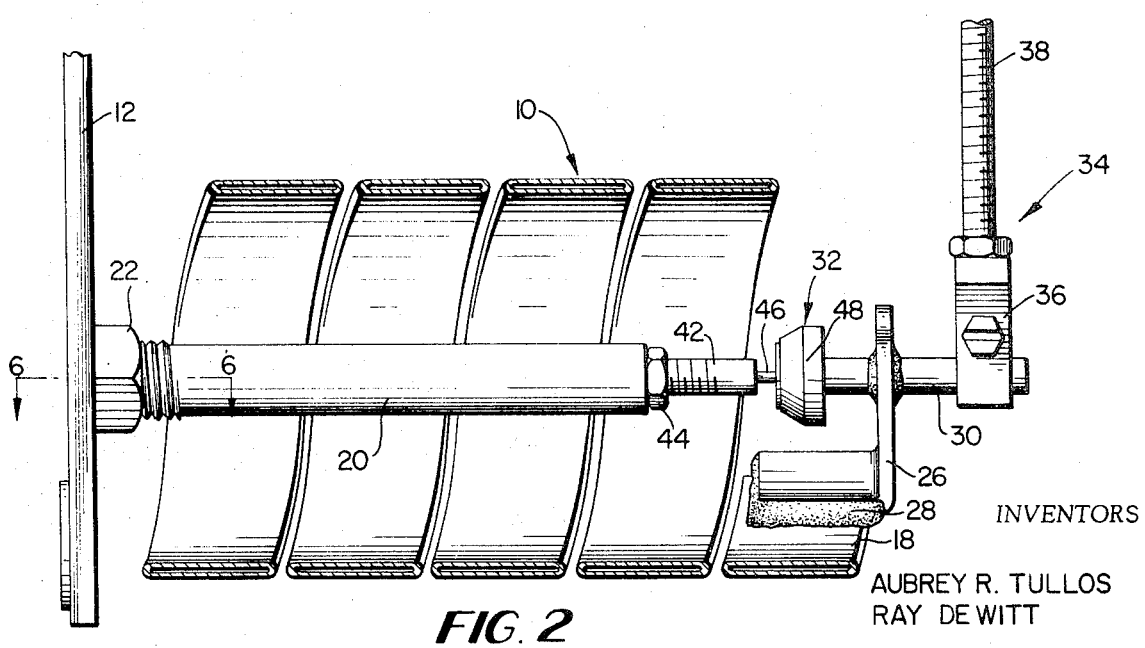
FIG. 2 is a view similar to FIG. 1, but with the helical Bourdon tube longitudinally sectioned to show further details of the support assembly.

A primary embodiment of bearing assembly is best illustrated in FIGS. 2, 3 and 4. The outer end of guide post 20 is internally threaded to receive a spindle shaft 42 having a threaded lower end enabling its longitudinal adjustment with respect to guide post 20, and hence along the axis of the helix formed by Bourdon tube 10. The adjustment position is secured by means of a locknut 44. Shaft 42 has a reduced diameter spindle 46 at the outer end thereof which provides one bearing surface of bearing assembly 32. Spindle 46 is seated within a radial bearing unit 48 which comprises an enlarged seat 50 formed on the inner end of recorder arm drive post 30 and an annular radial bearing 52 received within seat 50. An aperture 53 through bearing 52 will receive the spindle 46 with a close running fit. A concentric bore 54 is formed internally of readout arm drive post 30 behind annular radial bearing 52 and, preferably, has a diameter slightly larger than the aperture 53 in radial bearing 52 to prevent contact between spindle 46 and the interior walls of bore 54, which would cause undesirable friction between relatively moving parts of the assembly which would, in turn, create readout error.

Radial bearing 52 is formed from a synthetic non-lubricated material such as nylon, a polyethylene compound, or polytetrafluoroethylene thereby presenting an extremely low friction contact area between spindle 46 and bearing 52. The drive post bore 54, besides being of sufficiently large diameter to avoid any contact of spindle 46 therewith, is also sufficiently deep (FIG. 4) to prevent any bottoming contact of spindle 46 therein.

Readout arm post 30 may be fixed to mounting bar 26 by silver solder 56 (FIG. 4) or, in another embodiment, may be threaded through bar 26 for longitudinal adjustment therein (FIG. 5). In the latter embodiment, one or two locknuts 58, 58 are provided to secure drive post 30 in a predetermined position.

Radial bearing assembly 32 is configured to eliminate any spiralling motion of readout end 18 of Bourdon tube 10 and to minimize friction between relatively moving parts of the invention, namely spindle 46 and radial bearing 52. Radial motion of readout end 18 is prevented due to a close running fit between spindle 46 and the aperture 53 in bearing 52 and the rigid interconnection of spindle 46, shaft 42, guide post 20 and base 12 on the inner side of bearing assembly 32, and the complementary rigid interconnection of bearing 52, seat 50, drive post 30, mounting bar 26 and Bourdon tube readout end 18 on the outer side of the bearing assembly 32. Thus the recorder arm support 34 is constrained to rotate only about the axis formed by the helix of Bourdon tube 10, in that post 20, spindle 46 and shaft 42, bearing 48 and readout arm drive post 30 are arranged coincident with the Bourdon tube axis. Spindle 46 is of sufficient length to remain projected through the radial bearing 52 so that parts remain axially aligned as set forth above. Since no thrust contact surfaces are presented by the structure described, one source of friction contact causing readout error is eliminated. Radial friction contact which might induce error is minimized due to the provision of synthetic low friction bearing 52.

The original drawings of this application are precise scale drawings taken from a working embodiment of the invention, FIGS. 1, 2, 3, 5, 8 and 9 being twice actual size of the invention, and FIGS. 4, 6 and 7 being four times actual size. The invention was mounted in an assembly having a circular recording chart and was tested for accuracy against known pressures in a source line. Four independent test checks were made at maximum pressures of 50 psi, 100 psi, 150 psi and 250 psi with several stops made between zero and the maximum pressure to check for error. In each case, the maximum range or error was found to be about 1 percent to either side of the true value, which represents remarkably substantial improvement over the 5 to 6 percent error range common in such gauges.

Figure 8:
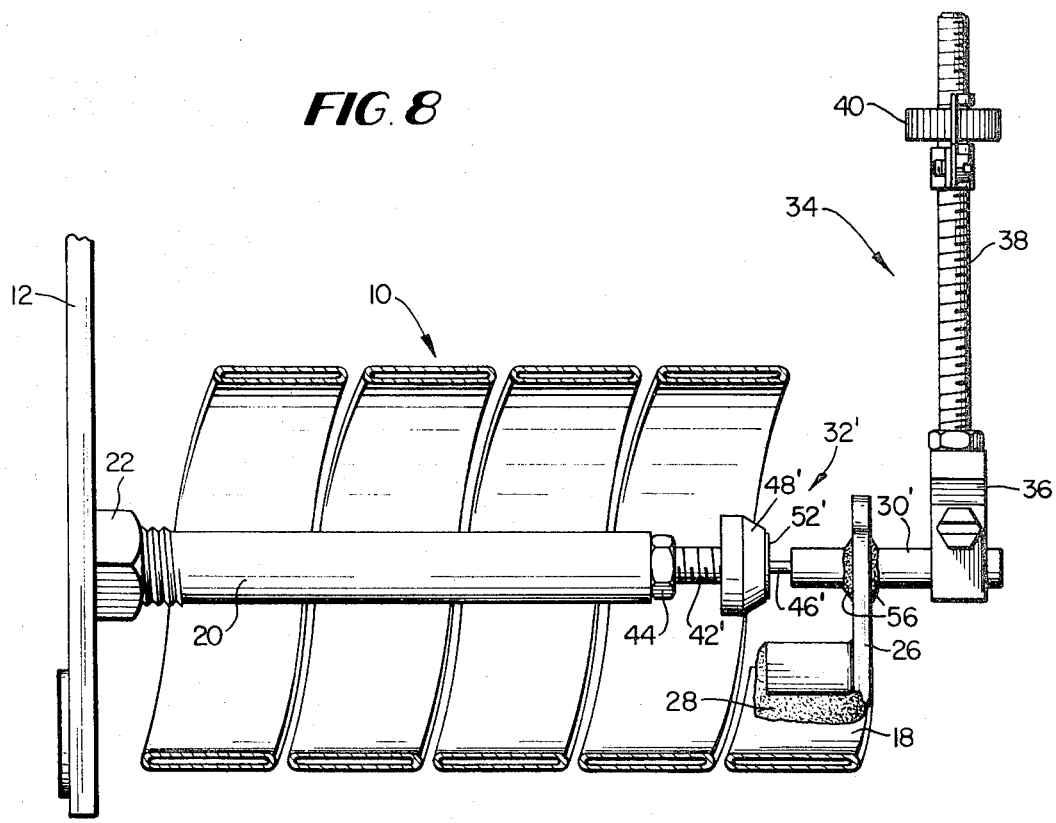
FIGS. 8 and 9 are views similar to FIGS. 1 and 2 showing a further alternative embodiment of the invention.
Figure 9:
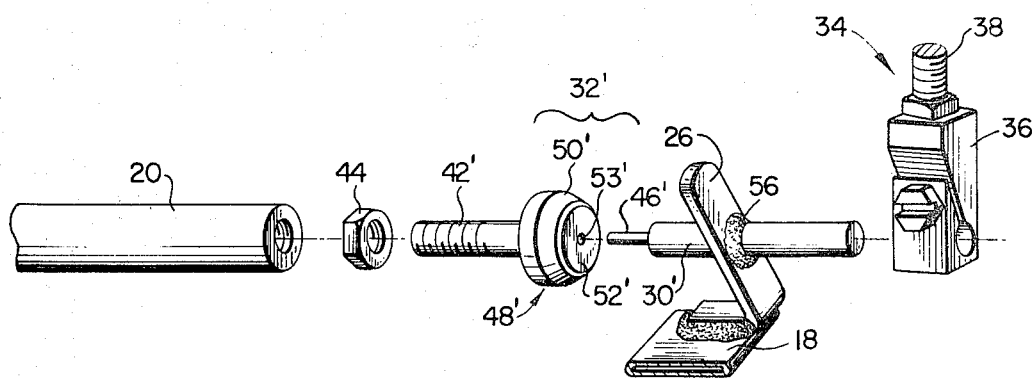

The embodiment of the invention illustrated in FIGS. 8 and 9 is quite similar to the embodiments hereinbefore described, except that the elements comprising bearing assembly 32' have been reversed, with bearing 48' and its insert 52' with aperture 53' being the stationary member, mounted on shaft 42' threaded to guide post 20, and spindle 46' is the rotating member, it being formed at the inner end of recorder arm drive post 30'.

Another embodiment of the invention is shown in FIG. 7 wherein bearing assembly 32 is replaced by a conical bearing assembly 60, comprising a stationary synthetic low friction conical bearing seat 62 located at the outer end of shaft 42", and a rotating cooperating needle cone 64, formed at the inner end of readout arm drive post 30".

The great number of threadably interconnected members in the invention is provided to ease disassembly of parts for replacement due to wear as well as to allow precise calibration according to the type of Bourdon tube 10 supported by the invention.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. A condition responsive helical coil Bourdon tube assembly comprising: a helical coil Bourdon tube having a pressure inlet end and a closed, readout end; means mounting said pressure inlet end of said helical Bourdon tube rigidly on the base; readout arm mounting means fixed to said closed readout end of said helical Bourdon tube and having a portion extending through the axis of said helical Bourdon tube; elongate support means having one end secured to said base and extending along the axis of said helical coil Bourdon tube; and a low friction bearing assembly interconnecting said readout arm mounting means portion and the other end of said elongate support means; said bearing assembly comprising a spindle, projected coaxially within said helical coil Bourdon tube from one of said elongate support means or said readout arm mounting means portion, and single, annular bearing means mounted on the other of said elongate support means of said readout arm mounting means portion, said bearing means having a radial bearing surface therein conforming to and in a close running fit with said spindle, said spindle projecting entirely through and contacting only said radial bearing surface, at least said bearing surface being made of non-lubricated low friction coefficient synthetic material, the axial length of said bearing surface being substantially in the range of twice the diameter of said spindle, for eliminating spiralling movement of said Bourdon tube due to condition changes, for negating friction losses and for constraining said readout arm mounting means to rotate only on an axis coincident with the axis of said helical coil Bourdon tube whereby hysteresis and readout error are minimized.

2. The Bourdon tube assembly as recited in claim 1 wherein said bearing means comprises a non-lubricated low friction coefficient synthetic material.

3. The Bourdon tube assembly as recited in claim 2, wherein said material is nylon.

4. The Bourdon tube assembly as recited in claim 2, wherein said material is a polyethylene compound.

5. The Bourdon tube assembly as recited in claim 2, wherein said material is a polytetrafluoroethylene compound.

6. The Bourdon tube assembly as recited in claim 1, wherein said elongate support means includes a guide post with said other end being internally threaded and said spindle includes an inner mounting shaft end threaded into said guide post internally threaded end, thereby enabling selective axial adjustment of said spindle relative to said post.

7. The Bourdon tube assembly as recited in claim 6, wherein said spindle, in its adjusted position, is secured on said guide post by means of a locknut.

8. The Bourdon tube assembly as recited in claim 6, wherein said one end of said guide post is threaded to said base for selective axial adjustment and a locknut on said one end of said guide post adapted to abut said base enables securing of said guide post in a selected adjustment position.

9. The Bourdon tube assembly as recited in claim 1, wherein said readout arm mounting means comprises a mounting bar rigidly secured to said Bourdon tube closed end and projecting radially inward of said helical coil to a disposition over the helical coil axis; a readout arm drive post secured on the mounting bar coaxial with said guide post, said annular bearing means being located on the inner end of said drive post and on said spindle; and means on the outer end of said drive post for mounting a readout arm.

10. The Bourdon tube assembly as recited in claim 9, wherein said drive post inner end includes: means defining a seat therein to receive said annular bearing means; and means defining a bore therein behind said seat to receive the free end of said spindle, the diameter of said bore being greater than that of said radial bearing surface whereby said spindle remains out of contact with the walls of said bore.

11. The Bourdon tube assembly as recited in claim 9, wherein said drive post is threaded through said mounting bar for axial adjustment therein and locknut means on said drive post secures said drive post to said mounting bar in selected adjusted position.

12. In a condition responsive helical coil Bourdon tube assembly comprising a helical coil Bourdon tube having a pressure inlet end and a closed, readout end, means mounting said pressure inlet end of said helical Bourdon tube rigidly on the base, readout arm mounting means fixed to said closed readout end of said helical Bourdon tube and having a portion extending through the axis of said helical Bourdon tube, elongate support means having one end secured to said base and extending along the axis of said helical coil Bourdon tube: a low friction bearing assembly interconnecting said readout arm mounting means portion and the other end of said elongate support means, said bearing assembly comprising: a spindle, projected coaxially within said helical coil Bourdon tube from one of said elongate support means or said readout arm mounting means portion; and single, annular bearing means mounted on the other of said elongate support means or said readout arm mounting means portion, said bearing means having a radial bearing surface therein conforming to and in a close running fit with said spindle, said spindle projecting entirely through and contacting only said radial bearing surface, at least said bearing surface being made of non-lubricated low friction coefficient synthetic material, the axial length of said bearing surface being substantially in the range of twice the diameter of said spindle, for eliminating spiralling movement of said Bourdon tube due to condition changes, for negating friction losses and for constraining said readout arm mounting means to rotate only on an axis coincident with the axis of said helical coil Bourdon tube whereby hysteresis and readout error are minimized.

13. The low friction bearing assembly as recited in claim 12, wherein said annular bearing comprises a non-lubricated low friction coefficient synthetic material.

14. The low friction bearing assembly as recited in claim 12, wherein said other of said guide post or readout arm mounting means includes means defining a cylindrical seat formed coaxially with the axis of said helical coil Bourdon tube for mounting said annular bearing means and means defining a bore within said other of said guide post or readout arm mounting means coaxially behind said cylindrical seat to receive the free end of said spindle, the diameter of said bore being greater than that of said radial bearing surface whereby said spindle remains out of contact with the walls of said bore.

* * * * *

UNITED STATES PATENT OFFICE
CERTIFICATE OF CORRECTION

Patent No. 3,774,452          Dated   November 27, 1973

Inventor(s)   Aubrey R. Tullos and Ray Dewitt

It is certified that error appears in the above-identified patent and that said Letters Patent are hereby corrected as shown below:

Column 5, line 60, after the "colon" insert -- a base,--.
Column 6, line 10, change "of" to -- or --.

Column 7, line 10, after "comprising" insert -- a base, --.
Column 7, line 17, "said" should read -- the --.

Signed and sealed this 3rd day of September 1974.

(SEAL)
Attest:

McCOY M. GIBSON, JR.          C. MARSHALL DANN
Attesting Officer             Commissioner of Patents